United States Patent
Kawahara

(10) Patent No.: US 10,406,444 B2
(45) Date of Patent: Sep. 10, 2019

(54) PROGRAM, INFORMATION PROCESSING APPARATUS, AND CONTROL METHOD

(71) Applicant: GREE, Inc., Tokyo (JP)

(72) Inventor: Hiroshi Kawahara, Tokyo (JP)

(73) Assignee: GREE, Inc., Tokyo (JP)

( * ) Notice: Subject to any disclaimer, the term of this patent is extended or adjusted under 35 U.S.C. 154(b) by 203 days.

(21) Appl. No.: 15/792,161

(22) Filed: Oct. 24, 2017

(65) Prior Publication Data

US 2018/0117474 A1    May 3, 2018

(30) Foreign Application Priority Data

Oct. 31, 2016 (JP) .................. 2016-212490
Mar. 22, 2017 (JP) .................. 2017-056386
May 1, 2017 (JP) .................. 2017-091131

(51) Int. Cl.
*A63F 13/79* (2014.01)
*A63F 13/335* (2014.01)
(Continued)

(52) U.S. Cl.
CPC ............ *A63F 13/79* (2014.09); *A63F 13/217* (2014.09); *A63F 13/25* (2014.09); *A63F 13/335* (2014.09); *A63F 13/48* (2014.09); *A63F 13/55* (2014.09); *A63F 13/58* (2014.09); *A63F 13/60* (2014.09); *A63F 13/63* (2014.09); *A63F 13/67* (2014.09);
(Continued)

(58) Field of Classification Search
None
See application file for complete search history.

(56) References Cited

U.S. PATENT DOCUMENTS 6,024,643 A * 2/2000 Begis .................. A63F 13/12 463/42
2007/0060359 A1* 3/2007 Smith .................. A63F 13/327 463/42
(Continued)

FOREIGN PATENT DOCUMENTS

JP    5819510 B1    11/2015

OTHER PUBLICATIONS

Office Action dated Jan. 17, 2017 of corresponding Japanese application No. 2016-212490; 10 pgs.
(Continued)

*Primary Examiner* — Jason T Yen
(74) *Attorney, Agent, or Firm* — Maier & Maier, PLLC

(57) ABSTRACT

A program, an information processing apparatus, and a control method that can facilitate adjustment of game balance. The information processing apparatus may store information concerning game mediums; may change, with regard to one game medium of a user, a first parameter in accordance with a change of a second parameter or may change the second parameter within a range corresponding to the first parameter; may determine a characteristic value on the basis of the information concerning the game medium of a first user; may prepare a new game medium on the basis of information concerning a reference game medium of a second user and a ratio of the characteristic value to the first parameter of the reference game medium; and may transmit information required for execution of game contents which progress using the new game medium to a first terminal device of the first user.

7 Claims, 10 Drawing Sheets

(51) Int. Cl.

| | |
|---|---|
| *A63F 13/25* | (2014.01) |
| *A63F 13/217* | (2014.01) |
| *A63F 13/60* | (2014.01) |
| *A63F 13/63* | (2014.01) |
| *A63F 13/48* | (2014.01) |
| *A63F 13/822* | (2014.01) |
| *A63F 13/55* | (2014.01) |
| *A63F 13/80* | (2014.01) |
| *A63F 13/67* | (2014.01) |
| *A63F 13/58* | (2014.01) |
| *A63F 13/35* | (2014.01) |
| *A63F 13/95* | (2014.01) |

(52) U.S. Cl.
CPC ............ *A63F 13/80* (2014.09); *A63F 13/822* (2014.09); *A63F 13/35* (2014.09); *A63F 13/95* (2014.09); *A63F 2300/6027* (2013.01)

(56) References Cited

U.S. PATENT DOCUMENTS

2012/0295718 A1\* 11/2012 Paquet ................... A63F 13/86
463/43
2017/0282063 A1\* 10/2017 Krishnamurthy ... A63F 13/5375

OTHER PUBLICATIONS

[NaruColle Shippuranbu] Extreme Strategy Naruto Shinobi Collection by GREE, Aug. 3, 2015, [online], [Searched on Dec. 27, 2016], Internet <URL:http://web.archive.org/web/20150803025004/http://xn-tck2b69ef9608dnjua.com/category2/ (URL of Internet Archive archived on Aug. 3, 2015 is inserted)>.

Office Action dated Nov. 20, 2018 in corresponding Japanese Application No. 2017-091131; 4 pages including English-language translation.

Office Action dated May 22, 2018 of corresponding Japanese application No. JP2017-091131; 15 pgs.

"Arado Senki", LOGiN, Enterbrain Co., Ltd., Published: Nov. 1, 2006, vol. 25, No. 11, p. 124-125, 10 pgs.

"EverQuest II", LOGiN, Enterbrain Co., Ltd., Published: Aug. 1, 2005, vol. 24, No. 8, p. 1-5, 22 pgs.

[Narcole Shippu Ranbu] Extreme Strategy Naruto Shinobu Collection by Glee, Published: Aug. 3, 2015 [Online], Searched: Dec. 27, Heisei 28, Internet URL: [hppt: //web.archive.org/web /20150803025004/http://xn-tck2b9ef9608dnjua.com/category2/], 4 pgs.

\* cited by examiner

FIG.2

| USER ID | INFORMATION CONCERNING OWNED GAME MEDIUM | INFORMATION CONCERNING USED GAME MEDIUM |
|---|---|---|
| user01 | **** | **** |
| user02 | **** | **** |
| user03 | **** | **** |
| ... | ... | ... |

FIG. 3

| CHARACTER ID | CHARACTER NAME | LEVEL | RARITY | MAXIMUM HP | HP GRADE | MAXIMUM SP | SP GRADE | OFFENSIVE POWER | OFFENSIVE POWER GRADE | DEFENSIVE POWER | DEFENSIVE POWER GRADE | SATIS-FACTION | SATISFACTION GRADE | ATTRIBUTE | INFORMATION CONCERNING GAME FUNCTION |
|---|---|---|---|---|---|---|---|---|---|---|---|---|---|---|---|
| *** | CHARACTER A | *** | *** | *** | *** | *** | *** | *** | *** | *** | *** | *** | *** | *** | *** |
| *** | CHARACTER B | *** | *** | *** | *** | *** | *** | *** | *** | *** | *** | *** | *** | *** | *** |
| *** | CHARACTER C | *** | *** | *** | *** | *** | *** | *** | *** | *** | *** | *** | *** | *** | *** |
| ... | ... | ... | ... | ... | ... | ... | ... | ... | ... | ... | ... | ... | ... | ... | ... |

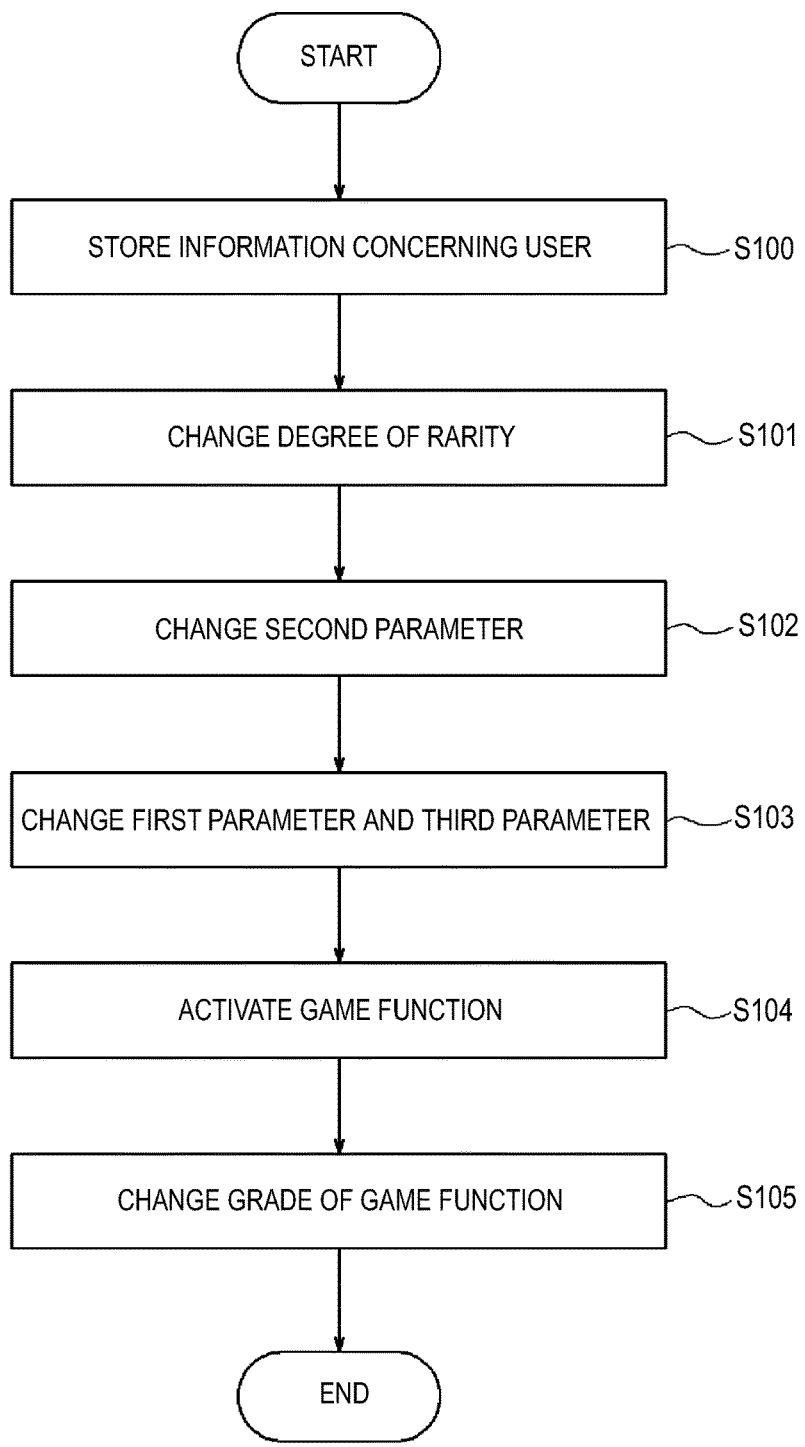

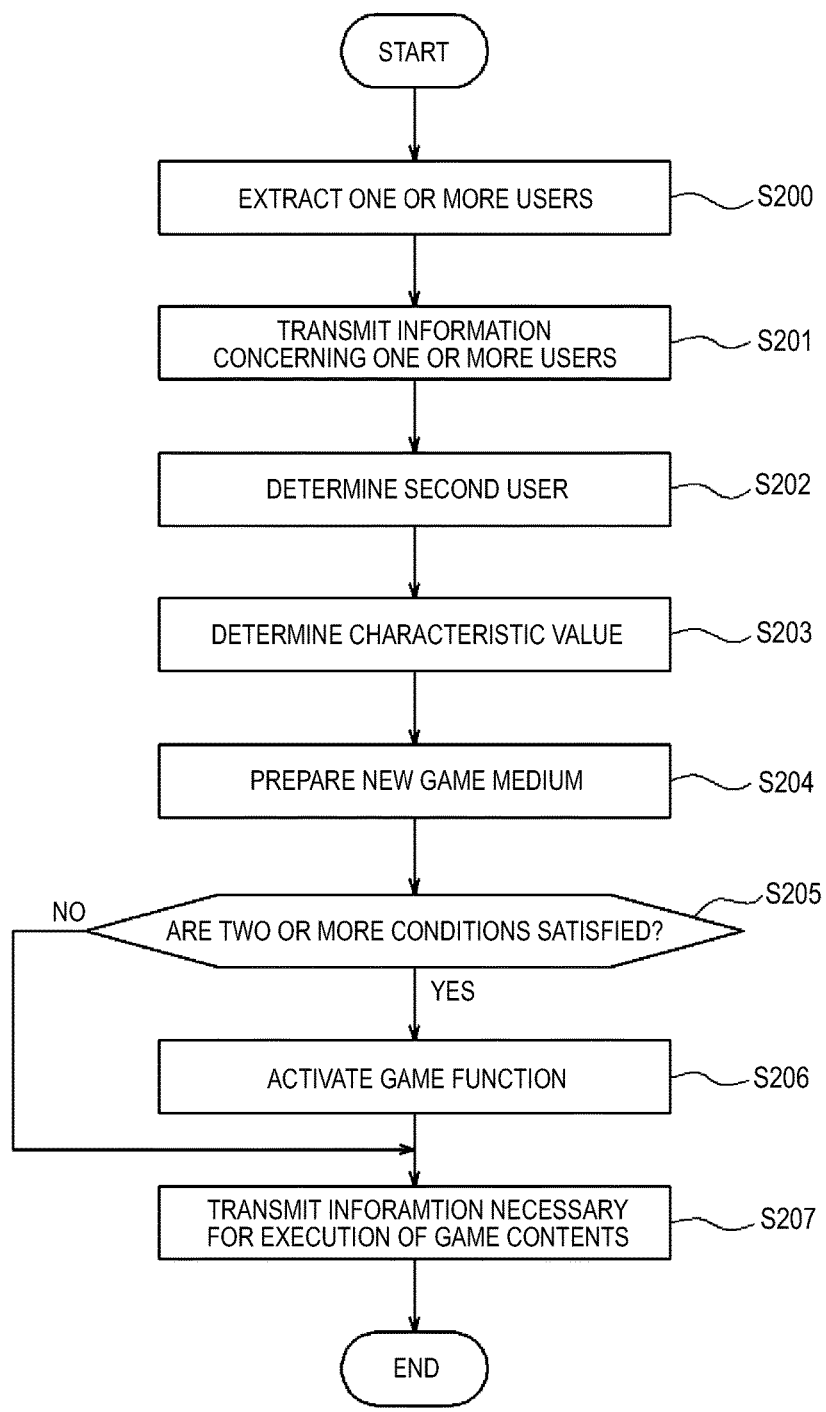

PROGRAM, INFORMATION PROCESSING APPARATUS, AND CONTROL METHOD

FIELD

Exemplary embodiments described herein relate to a program, an information processing apparatus, and a control method.

BACKGROUND

In the related art, a game which may use a character which has been leveled up or grown in strength in the game by a user is known. For example, Japanese Patent No. 5,819,510 discloses a game which is played by a user by borrowing a character of another user.

However, in the game in which a character of another user is borrowed, since powers of characters may be different depending on the users, it may be difficult to adjust game balance. For example, when a user not owning a powerful character plays a game by borrowing a powerful character owned by another user, the game may decline in difficulty. Accordingly, there is room for improvement in adjustment of game balance.

SUMMARY

An exemplary embodiment of the invention is made in consideration of the above-mentioned circumstances and an object thereof is to provide a program, an information processing apparatus, and a control method that can facilitate adjustment of game balance.

A program according to an exemplary embodiment may cause an information processing apparatus which can communicate with a plurality of terminal devices used by a plurality of users, respectively, to perform: a step of storing each of the plurality of users and information concerning one or more game mediums including one first parameter and a plurality of second parameters for each game medium in correlation with each other; a step of changing, with regard to one game medium correlated with the user, the first parameter in accordance with a change of at least one second parameter which is automatically selected or selected by a user operation or changing the at least one second parameter which is automatically selected or selected by the user operation within a range corresponding to the first parameter; a step of determining a characteristic value on the basis of the information concerning the game medium correlated with a first user; a step of preparing a new game medium on the basis of the information concerning a reference game medium among one or more game mediums correlated with a second user and a ratio of the characteristic value to the first parameter of the reference game medium; and a step of transmitting information required for execution of game contents which progress using the new game medium to a first terminal device of the first user.

An information processing apparatus according to an exemplary embodiment may be an information processing apparatus which can communicate with a plurality of terminal devices used by a plurality of users, the information processing apparatus including: a storage unit configured to store each of the plurality of users and information concerning one or more game mediums including one first parameter and a plurality of second parameters for each game medium in correlation with each other; and a control unit, in which the control unit may be configured to: change, with regard to one game medium correlated with the user, the first parameter in accordance with a change of at least one second parameter which may be automatically selected or selected by a user operation or change the at least one second parameter which may be automatically selected or selected by the user operation within a range corresponding to the first parameter; determine a characteristic value on the basis of the information concerning at least one game medium correlated with a first user; prepare a new game medium on the basis of the information concerning a reference game medium among one or more game mediums correlated with a second user and a ratio of the characteristic value to the first parameter of the reference game medium; and transmit information required for execution of game contents which progress using the new game medium to a first terminal device of the first user.

A control method according to an exemplary embodiment may be a control method of a game which may be performed by an information processing apparatus that can communicate with a plurality of terminal devices used by a plurality of users, the control method including: a step of storing each of the plurality of users and information concerning one or more game mediums including one first parameter and a plurality of second parameters for each game medium in correlation with each other; a step of changing, with regard to one game medium correlated with the user, the first parameter in accordance with a change of at least one second parameter which may be automatically selected or selected by a user operation or changing the at least one second parameter which may be automatically selected or selected by the user operation within a range corresponding to the first parameter; a step of determining a characteristic value on the basis of the information concerning at least one game medium correlated with a first user; a step of preparing a new game medium on the basis of the information concerning a reference game medium among one or more game mediums correlated with a second user and a ratio of the characteristic value to the first parameter of the reference game medium; and a step of transmitting information required for execution of game contents which progress using the new game medium to a first terminal device of the first user.

In the program, the information processing apparatus, and the control method according to exemplary embodiments such as those disclosed herein, it may be possible to easily adjust game balance.

BRIEF DESCRIPTION OF THE DRAWINGS

FIG. 2 is a diagram illustrating information concerning users;

FIG. 3 is a diagram illustrating information concerning game mediums;

FIG. 9 is a flowchart illustrating a first operation of a server device; and FIG. 10 is a flowchart illustrating a second operation of the server device.

DETAILED DESCRIPTION OF THE INVENTION

Figure 1:
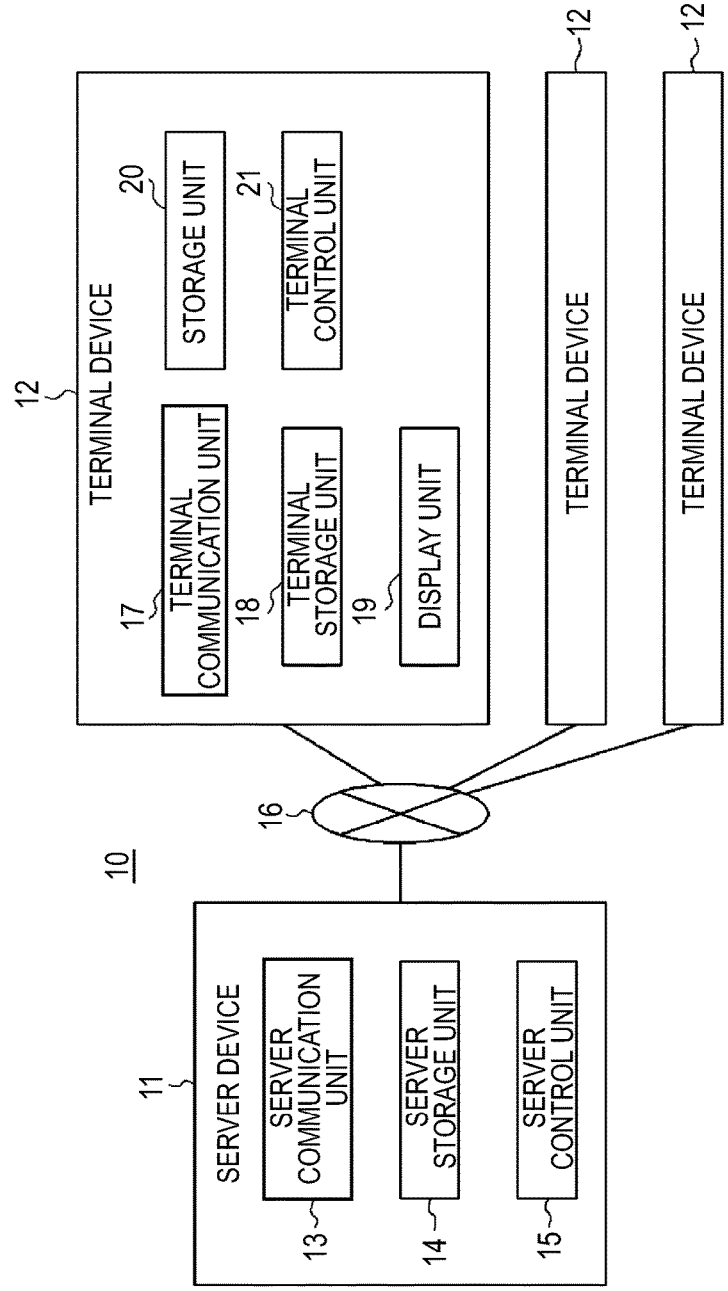
FIG. 1 is a block diagram illustrating a game system according to an exemplary embodiment.

Hereinafter, various exemplary embodiments will be described.

(Outline of Game System)

An outline of a game system 10 according to an exemplary embodiment will be described below with reference to FIG. 1. The game system 10 includes a server device 11 and a plurality of terminal devices 12. Three terminal devices 12 may be illustrated in FIG. 1 for the purpose of convenience, but the number of terminal devices 12 can be two or more.

The server device 11 may be an information processing apparatus such as a server which may be managed by a game administrator. The terminal device 12 may be an information processing apparatus which may be used by a user, such as a mobile phone, a smart phone, a tablet terminal, a personal computer (PC), or a game machine. The server device 11 and the terminal devices 12 may be connected to be able to communicate with each other via a network 16 such as the Internet. For example, the server device 11 and the terminal device 12 may perform various processes concerning a game in cooperation with each other.

(Outline of Game)

An outline of a game according to this embodiment may be described below. The game according to this embodiment includes various game contents. At least some game contents of various game contents may be executed using game mediums.

A game medium may be electronic data which may be used for the game; examples thereof may include an arbitrary medium such as a card, item, virtual currency, a ticket, a character, and an avatar. A game medium may be electronic data which can be retrieved, owned, used, managed, exchanged, integrated, reinforced, sold, abandoned, donated, or the like in the game by a user, but use forms of a game medium may not be limited to those explicitly described in this specification.

In the following description, unless particularly mentioned, a "game medium which is owned by a user" refers to a game medium which may be correlated as an owned game medium with a user ID which can uniquely identify the user. "Giving a game medium to a user" refers to correlating the game medium as an owned game medium with a user ID. "Abandoning a game medium owned by a user" refers to releasing a correlation of a user ID with the owned game medium. "Consuming a game medium owned by a user" refers to generating and retrieving a certain advantage or influence in a game due to release of a correlation of a user ID with an owned game medium. "Selling a game medium owned by a user" refers to releasing a correlation of a user ID with an owned game medium and correlating the user ID with another game medium (such as virtual currency or an item) as an owned game medium. "Transferring a game medium owned by user A to user B" refers to releasing a correlation of a user ID of user A with an owned game medium and correlating a user ID of user B with the game medium as an owned game medium. "Preparing a game medium" refers to defining or determining at least a part of information concerning the game medium. Details of information concerning a game medium may be described later.

Game contents may be contents which can be played in a game by a user; examples thereof may include a quest, a mission, a mini game, growing, reinforcing, and integrating a game medium, a game medium acquisition event, a virtual space exploration event, and a fighting event with an opponent (such as another user, an enemy character, and an enemy building). For example, when it is determined that one or more predetermined conditions (game tasks) set by game contents may be successfully satisfied, for example, a game medium may be given as a reward to a user. An arbitrary task corresponding to details of the game contents such as a task of winning in fighting with an enemy character and a task of reaching a goal point in a virtual space can be adopted as the game task. Completion of a specific task (a task to be cleared) among one or more game tasks set in game contents may also be referred to as clearing of the game contents. When a user who plays game contents succeeds in completing a task to be cleared, it may be determined that the game contents has been cleared, and the game contents may end.

Various game contents may include single-player game contents and multi-player game contents. The single-player game contents may be game contents (for example, single-user game contents) which may be executed on the basis of a user operation on one terminal device 12 used by the user. One terminal device 12 may execute single-player game contents alone or in cooperation with the terminal device 12 with the server device 11. On the other hand, multi-player game contents may be game contents (for example, multi-user game contents) which may be common to two or more users and which may be executed on the basis of user operations on two or more terminal devices 12 used by two or more users. Game contents which may be common to two or more users may include, for example, game contents in which at least a part of progressing processes and processing results of the game contents may be commonly applied to the two or more users. Two or more terminal devices 12 may execute multi-player game contents in cooperation or two or more terminal devices 12 and the server device 11 may execute multi-player game contents in cooperation.

A game in this embodiment includes game contents in which a user operates a game medium to perform exploration of a virtual space or fighting with an opponent. Hereinafter, these game contents may also be referred to as fighting contents. A game medium which may be used for fighting contents includes, for example, a user character which may be owned in the game by a user, but the game medium may not be limited to a user character. An opponent includes an enemy character such as a non-player character (NPC), but the opponent may not be limited to an enemy character. For example, in multi-player game contents, a game medium which may be operated by another user may be determined as an opponent.

Conclusively, in fighting contents of the game in this embodiment, fighting with an opponent may be carried out using a user character owned by a user and a new user character which has been adjusted with respect to a user character grown in strength or leveled up by another user. Details of the new user character may be described later.

(Configuration of Server Device)

A configuration of the server device 11 may be specifically described below. The server device 11 may include a server communication unit 13, a server storage unit 14, and a server control unit 15.

The server communication unit 13 may include an interface which communicates with an external device in a wired or wireless manner and transmits and receives information. The server communication unit 13 may include, for example, a wireless local area network (LAN) communication module or a wired LAN communication module. The server communication unit 13 can transmit and receive information to and from the terminal devices 12 via the network 16.

The server storage unit 14 may include, for example, a primary storage device and a secondary storage device. For example, the server storage unit 14 may include a semiconductor memory, a magnetic memory, an optical memory, or the like. The server storage unit 14 may store various pieces of information and programs which may be necessary for provision and control of a game. At least a part of the information and programs stored in the server storage unit 14 may be shared and synchronized with the terminal devices 12. For example, the server storage unit 14 may store information concerning one or more users.

Information concerning users may be described below with reference to FIG. 2. FIG. 2 illustrates information concerning three users. Information concerning a user may include various types of information specific to the user. For example, information concerning a user may include a user ID, information concerning owned game mediums, and information concerning used game mediums.

A user ID may be information for uniquely identifying a user as described above. Hereinafter, a user ID may also be simply referred to as a user.

Information concerning owned game medium may include various types of information specific to game mediums which may be owned in a game by a user. When a game medium is acquired by a user, the game medium may be correlated as an owned game medium with the user. In this embodiment, an owned game medium may include a user character which may be owned by a user, but the owned game medium may not be limited to a user character. Details of the information concerning an owned game medium may be described later.

Information concerning a used game medium may be information indicating a game medium which may be used by a user in fighting contents. A used game medium may be selected among the owned game mediums. In this embodiment, for example, three user characters in maximum selected among one or more owned game mediums may be correlated as used game mediums with a corresponding user. Accordingly, one user character may be an owned game medium and a used game medium. A used game medium may be selected automatically or by a user operation, for example, in dedicated game contents. For example, the dedicated game contents may include game contents in which users implement so-called deck organization or team organization.

In information concerning users, information concerning owned game mediums and information concerning used game mediums may be correlated with a plurality of users.

The above-mentioned information concerning an owned game medium may be described below in detail. Here, information concerning a user character among information concerning various owned game mediums may be described. FIG. 3 illustrates information concerning three user characters (Character A, Character B, and Character C) which may be owned by one user. For example, information concerning each user character may include information concerning a character ID, a character name, a level, a rarity, a maximum hit point (HP), an HP grade, a maximum special point (SP), an SP grade, an offensive power, an offensive power grade, a defensive power, a defensive power grade, a critical hit likelihood, a critical hit likelihood grade, attributes, and game functions. Here, the level may also be referred to as a first parameter. The maximum HP, the maximum SP, the offensive power, the defensive power, and the critical hit likelihood may also be referred to as a second parameter unless particularly distinguished. The HP grade, the SP grade, the offensive power grade, the defensive power grade, and the critical hit likelihood grade may also be referred to as a third parameter unless particularly distinguished. In an embodiment, the first parameter may include a parameter which cannot be arbitrarily adjusted by a user. The second parameter may include a parameter which can be arbitrarily adjusted by a user. The third parameter may include a parameter which changes with a change of the second parameter. Here, the parameter which can be arbitrarily adjusted by a user may include, for example, a parameter which can be selected by a user operation and of which a value can be determined or changed by a user operation. On the other hand, the parameter which cannot be arbitrarily adjusted by a user may include, for example, a parameter which can be automatically determined or changed regardless of a user operation. For example, the parameter which cannot be arbitrarily adjusted by a user may include a parameter which changes automatically by interlocking with a change of the parameter (for example, the second parameter) which can be arbitrarily adjusted by a user and a parameter which changes automatically by interlocking with occurrence of a predetermined event in a game. Examples of the predetermined event may include an event of winning in fight with an enemy character.

A character ID may be information for uniquely identifying a user character. The character ID may be stored, for example, in the server storage unit 14 in advance. Alternatively, the character ID may be determined by the server device 11 when the user character is acquired by a user.

A character name may be information indicating a name of a user character. The character name may not uniquely identify the user character unlike the character ID. An initial value of the character name may be stored in the server storage unit 14 in advance. The character name may change based on a user who has acquired the user character playing the game.

A level may be information indicating a degree of growth of a user character. For example, as a value of the level becomes larger, the degree of growth of the user character becomes larger. In this embodiment, the value of the level may be a sum of the HP grade, the SP grade, the offensive power grade, the defensive power grade, and the critical hit likelihood grade. Details of the HP grade, the SP grade, the offensive power grade, the defensive power grade, and the critical hit likelihood grade may be described later.

Rarity may be information indicating a degree of rarity of a user character. For example, as the value of the rarity becomes larger, the degree of rarity of the user character becomes higher. The rarity may change based on a user who has acquired the user character playing the game. In this embodiment, the rarity may increase by consuming a specific game medium in a process associated with growing in strength or leveling up of a user character which may be described later. As the value of the rarity increases, upper limit values of the HP grade, the SP grade, the offensive power grade, the defensive power grade, and the critical hit likelihood grade may increase. For example, by consuming a specific game medium, the rarity may increase and the upper limit value of at least one of the HP grade, the SP grade, the offensive power grade, the defensive power grade, and the critical hit likelihood grade may increase. Accordingly, an increase of the rarity may be more advantageous for a user. Hereinafter, the specific game medium required for an increase in rarity may also be referred to as a first material.

A maximum HP may be information indicating a maximum value of an HP which may be a parameter indicating, for example, a vital power of a user character. In this embodiment, when a user character is damaged by an offensive action of an enemy character, the HP may decrease by a damage value. When the user character recovers by a recovery action, the HP may increase by a recovery value. When the HP decreases to zero, it may be determined that the user character is disabled, or the user may fail to clear game contents. Accordingly, an increase in maximum HP of a user character may be advantageous for a user.

An HP grade may be information indicating a degree of growth of the maximum HP of a user character. In this embodiment, the maximum HP and the HP grade increase by consuming a specific game medium in a process associated with growing in strength or leveling up of a user character which may be described later. Accordingly, as the HP grade increases, the maximum HP may increase and thus it may be advantageous for a user. Hereinafter, the specific game medium required for an increase in maximum HP and HP grade may be also referred to as a second material.

A maximum SP may be information indicating a maximum value of an SP which may be a parameter consumed, for example, when a user character executes a predetermined action. The predetermined action may include, for example, an action which is executable by activating a game function corresponding to the action as may be described later. In this embodiment, when a user operation for executing the predetermined action for the user character is detected, the SP of the user character may decrease by the value of the consumed SP set by the action and the action may be executed. When the SP of the user character is less than the value of the consumed SP of the action, control may be performed such that the action cannot be executed. Accordingly, an increase in maximum SP of a user character may be advantageous for a user.

An SP grade may be information indicating a degree of growth of the maximum SP of a user character. The SP grade may be the same as the HP grade corresponding to the maximum HP except for correspondence to the maximum SP and thus description thereof will not be repeated.

An offensive power may be, for example, information contributing to a damage value which may be applied to an opponent by an attack from a user character. As the value of the offensive power increases, the damage value applied to the opponent may increase. Accordingly, an increase in offensive power of a user character may be advantageous for a user.

An offensive power grade may be information indicating a degree of growth of the offensive power of a user character. The offensive power grade may be the same as the HP grade corresponding to the maximum HP except for correspondence to the offensive power and thus description thereof will not be repeated.

A defensive power may be, for example, information contributing to a damage value which may be applied to a user character by an attack from an opponent. As the value of the defensive power increases, the damage value applied from the opponent may decrease. Accordingly, an increase in defensive power of a user character may be advantageous for a user.

A defensive power grade may be information indicating a degree of growth of the defensive power of a user character. The defensive power grade may be the same as the HP grade corresponding to the maximum HP except for correspondence to the defensive power and thus description thereof will not be repeated.

A critical hit likelihood may be, for example, information contributing to a probability that an execution result of an action by a user character will be a result different from a normal result. For example, as a critical hit likelihood value increases, a probability that damage applied to an opponent by an attack from a user character may be greater than normal damage may increase. For example, as a critical hit likelihood value increases, a probability that an additional effect (for example, pursuit) will be generated when a user character gives an attack may increase. Accordingly, an increase in critical hit likelihood of a user character may be advantageous for a user.

A critical hit likelihood grade may be information indicating a degree of growth of the critical hit likelihood of a user character. The critical hit likelihood grade may be the same as the HP grade corresponding to the maximum HP except for correspondence to the critical hit likelihood and thus description thereof will not be repeated.

Attributes may be information indicating a superiority-inferiority relationship between characters fighting each other. The attributes may indicate, for example, at least one attribute of fire, wood, and water attributes. For example, a character with a fire attribute can give greater damage than normal damage to a character with a wood attribute and can give less damage than normal damage to a character with a water attribute. In this way, for example, a fire attribute may be more advantageous than a wood attribute and may be less advantageous than a water attribute.

Information concerning a game function may include information indicating whether the game function is activated for each of one or more game functions correlated with a user character and a grade of the activated game function. One user character may be correlated with an arbitrary number of game functions. A process for activating a game function may be described later. The game system may permit the execution of a game function (such as, for example, a game skill) which is designated as an activated game function, allowing the effect of the game function to take place, and may prevent the execution of a game function which is designated as a deactivated game function, preventing its effect from taking place. A game function may include various functions which can be performed during execution of a game. For example, when a game function is performed, an effect advantageous for a user can be generated in the game. Accordingly, activation of a game function can be said to be advantageous for a user.

For example, a game function may include a function which may be performed at a time corresponding to a user operation. Hereinafter, a game function which is performed at a time corresponding to a user operation may be also referred to as an active skill. When an active skill is performed, for example, a user character may execute a specific action. For example, an effect of applying greater damage than a normal attack action to an opponent may be generated by executing the specific action. A consumed SP may be set in the active skill. In this case, on the condition that the SP of a user character is consumed by the value of the consumed SP, the active skill may be performed. For example, a game function may include a function which may be continuously performed from a time point at which the game function may be activated. Hereinafter, the game function which may be continuously performed may also be referred to as a passive skill. When a passive skill is performed, for example, a state of a user character may be changed. For example, an effect of increasing the second parameter such as the maximum HP of a user character and an effect of giving predetermined characteristics (for example, characteristics of decreasing a damaged value) to a user character may be generated by the change in state of the user character.

As the grade value of a game function increases, an effect which may be generated by performing the game function may increase. For example, as the grade of an active skill of giving damage to an opponent increases, the damage value which may be applied to the opponent by the active skill may increase. In this embodiment, the grade of a game function may increase by consuming a specific game medium. Hereinafter, the specific game medium required for an increase in grade of a game function may be also referred to as a third material. For example, one grade which is common to one or more activated game functions may be set. Alternatively, one grade may be set for each activated game function.

Details of the information concerning a user may not be limited to the above description. For example, the information concerning a user may further include information indicating a reference game medium. In this embodiment, a reference game medium may be one or more user characters which may be selected by a user operation or automatically among one or more user characters which may be owned by a user. Processes using the reference game medium may be described later. For example, the information concerning a user may further include information indicating another user who satisfies predetermined conditions. In this embodiment, the information indicating another user who satisfies predetermined conditions may include, for example, a user ID of another user who may be unidirectionally or bidirectionally correlated with a user. The correlated users may perform communications such as transmission and reception of a message with each other over the game system 10. Hereinafter, another user in a case in which a first user may be unidirectionally correlated with the other user may also be referred to as a follow user of the first user. Another user in a case in which the other user may be unidirectionally correlated with a first user may also be referred to as a follower user of the first user. Another user in a case in which a first user and the other user may be bidirectionally correlated with each other may also be referred to as a friend user of the first user.

The server storage unit 14 illustrated in FIG. 1 may store information on an enemy character. An enemy character may be used as an opponent of a user character, which may be a game medium used by a user in fighting. The information concerning an enemy character may include arbitrary information specific to an enemy character. For example, the information concerning an enemy character may include a character ID, a character name, a level, a maximum HP, a maximum SP, an offensive power, a defensive power, a critical hit likelihood, and attributes. The information concerning an enemy character may be the same as the above-mentioned information concerning a user character and description thereof will not be repeated.

The server control unit 15 may include at least one of one or more general-purpose processors for realizing a specific function by reading a specific program and one or more dedicated processors that may be specialized for a specific process. The server control unit 15 controls the overall operations of the server device 11. Hereinafter, an example of operations of the server control unit 15 may be specifically described.

The server control unit 15 may store various types of information and programs which may be required for processing a game in the server storage unit 14. Information required for processing a game may include the information concerning a user, the information concerning an enemy character, information required for execution of fighting which may be described later, and the like. The process of storing the information concerning a user may include a process of storing each of a plurality of user and information on one or more user characters including one first parameter (for example, a level) and a plurality of second parameters (for example, a maximum HP) for each user character in correlation with each other.

The server control unit 15 may perform transmission and reception of information via the server communication unit 13. For example, the server control unit 15 may transmit at least a part of information stored in the server storage unit 14 to the terminal device 12. In this way, the information stored in the server storage unit 14 and the information stored in the terminal device 12 may be shared and synchronized with each other. A time at which sharing and synchronization of information may be performed can include, for example, a time at which new information may be stored in the server storage unit 14 and a time at which information stored in the server storage unit 14 may be updated, but may be arbitrarily determined.

The server control unit 15 may perform processing of a game in cooperation with the terminal device 12. The processing of a game may include, for example, a process associated with growing in strength or leveling up a user character which may be an owned game medium of a user and processing of fighting contents. An example of the operations of the server control unit 15 that may perform processing of a game may be specifically described below.

(Process Associated with Growing a Character's Power)

The process associated with growing a user character's strength or increasing their level may be described below. The server control unit 15 may change information concerning a user character of a user by a user operation of the terminal device 12 of the user or automatically. The server control unit 15 may additionally change arbitrary information included in the information concerning a user in addition to the information concerning a user character. The processing of changing information may include processing of updating the information stored in the server storage unit 14 to changed details.

Specifically, the server control unit 15 may increase the rarity of a user character by consuming the first material which may be owned by the user. The server control unit 15 may permit an increase in rarity when one or more predetermined conditions are satisfied or may prohibit an increase in rarity when the one or more conditions are not satisfied. The one or more conditions may include a condition that the level of a user character may be equal to or greater than a predetermined reference value. The reference value may be the same as the upper limit value of the level of the user character or may be arbitrarily determined. The one or more conditions may not be limited to the above description. Hereinafter, the one or more conditions which may be used to determine whether to permit an increase in rarity of a user character may also be referred to as one or more rarity increase conditions.

The server control unit 15 may change at least one second parameter (for example, a maximum HP) which may be selected automatically or selected by a user operation on the terminal device 12 among a plurality of second parameters of a user character by consuming the second material which may be owned by a user. The server control unit 15 may change the third parameter (for example, a HP grade) corresponding to the second parameter and the first parameter (the level) of the user character with a change of the second parameter.

The server control unit 15 may activate a game function of a user character. The server control unit 15 may permit activation of a game function when one or more predetermined conditions are satisfied and may prohibit activation of the game function when the one or more conditions are not satisfied. Alternatively, the server control unit 15 may automatically activate the game function when the one or more conditions are satisfied. The one or more conditions may include a condition that the level of the user character may be equal to or greater than a predetermined reference value corresponding to the game function. The reference value may be arbitrarily determined. The one or more conditions may include a condition that a game task (for example, a task designated as a task to be cleared) set for specific game contents corresponding to the game function was performed in the past. The one or more conditions may not be limited to the above description. Hereinafter, the one or more conditions which may be used to determine whether to permit activation of a game function of a user character may also be referred to as one or more first activation conditions. The specific game contents corresponding to the game function may also be referred to as release contents of the game function. Arbitrary game contents such as a mini game or fighting contents can be adopted as the release contents.

The server control unit 15 may increase the grade of a game function of a user character by consuming the third material which may be owned by a user.

(Processing of Fighting Contents)

Processing of fighting contents may be described below. The server control unit 15 may extract one or more users among a plurality of users except for the first user using a predetermined algorithm in response to a request from the terminal device 12 of the first user. The predetermined algorithm may include, for example, an algorithm of preferentially extracting at least one of a follow user, a follower user, and a friend user of the first user. The predetermined algorithm may include an algorithm using a filter condition as may be described later.

The server control unit 15 may transmit information concerning the extracted one or more users to the terminal device 12 of the first user. The information concerning a user transmitted to the terminal device 12 may include, for example, a user name of the user and information concerning a reference game medium of the user. For example, information concerning a user transmitted to the terminal device 12 may be displayed on the terminal device 12.

The server control unit 15 may determine one user which has been selected automatically or selected by a user operation of the terminal device 12 of the user among the extracted one or more users as a second user.

The server control unit 15 may determine a characteristic value on the basis of the information concerning one or more user characters which may be game mediums used by the first user. The characteristic value may be a maximum value or an average value of levels in the one or more user characters. For example, when the levels of three user characters which may be the game mediums used by the first user may be 50 points, 60 points, and 100 points, respectively, the characteristic value may be 100 points which may be a maximum value of the levels or 70 points which may be an average value of the levels. The characteristic value may not be limited to the above-mentioned example. For example, an arbitrary index indicating a degree of characteristic such as level, power, and performance of the used game mediums of the first user can be adopted.

Figure 4:
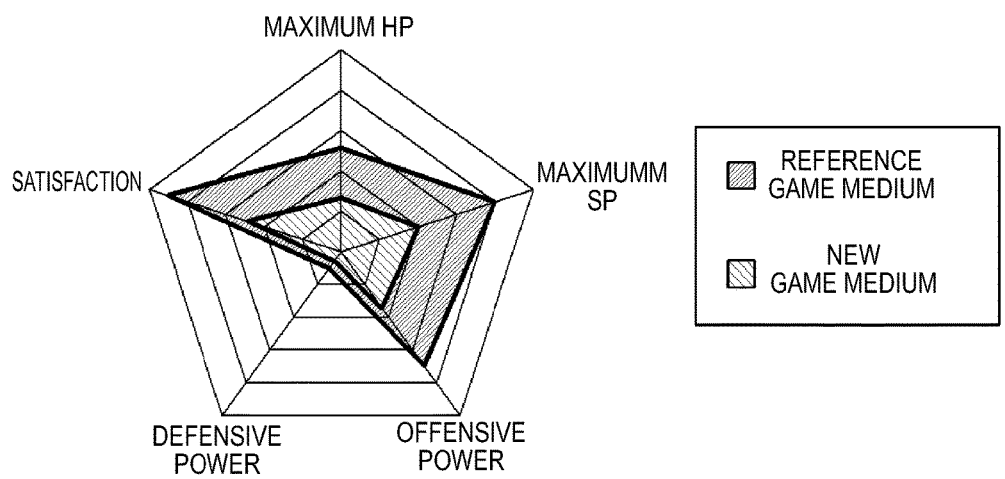
FIG. 4 is a radar chart illustrating a second parameter of a reference game medium of a second user and a second parameter of a new game medium.

The server control unit 15 may prepare a new game medium on the basis of information concerning a reference game medium of the second user and a ratio of the characteristic value to the level of the reference game medium. In this embodiment, the new game medium may be a new user character which may be used for fighting along with the used game mediums of the first user. Hereinafter, a new user character may also be referred to as an assistant character. A first parameter of the assistant character may be the same as the characteristic value. A plurality of second parameters of the assistant character may be equal to values obtained by changing a plurality of second parameters of the reference game medium of the second user at the above-mentioned ratio. For example, when the level of the reference game medium of the second user is 200 points and the characteristic value is 100 points, the second parameters of the new game medium may have the same values as obtained by multiplying the second parameters of the reference game medium of the second user by 100 points/200 points=1/2, for example, as illustrated in FIG. 4. In this way, when the level of the reference game medium is greater than the characteristic value, the second parameters of the new game medium may be less than the second parameters of the reference game medium. On the other hand, for example, when the level of the reference game medium of the second user is 100 points and the characteristic value is 200 points, the second parameters of the new game medium may have the same values as obtained by multiplying the second parameters of the reference game medium of the second user by 200 points/100 points=2. In this way, when the level of the reference game medium is less than the characteristic value, the second parameters of the new game medium may be greater than the second parameters of the reference game medium.

In this way, the second parameters (for example, the maximum HP) of a new game medium (an assistant character) may be adjusted at the ratio of the characteristic value to the first parameter (for example, the level) of the reference game medium with respect to the second parameters of the reference game medium of the second user. Here, the characteristic value may be determined on the basis of the information concerning the used game mediums of the first user as described above. According to this configuration, since a new game medium may be prepared depending on the levels of the used game mediums of the first user, it may be possible to easily adjust game balance. Since features (for example, variation tendencies of the second parameters) of the reference game medium of the second user may be reflected in the assistant character, it may be possible to improve attractiveness of the game.

The prepared assistant character may be correlated with the same game function as the reference game medium of the second user. In this case, the server control unit 15 may determine whether two or more predetermined conditions may be satisfied. The two or more conditions may include a condition that the level of the reference game medium of the second user may be equal to or greater than a reference value corresponding to the game function. The two or more conditions may include a condition that the above-mentioned characteristic value may be equal to or greater than the reference value. The two or more conditions may not be limited to the above description. For example, all or a part of the above-mentioned one or more first activation conditions which may be used to determine whether to permit activation of the game function of the user character may be included in the two or more conditions. Hereinafter, the two or more conditions which may be used to determine whether to permit activation of the game function of the assistant character may also be referred to as two or more second activation conditions. When it is determined that the two or more second activation conditions may be satisfied, the server control unit 15 may activate the game function correlated with the assistant character.

The server control unit 15 may transmit information necessary for execution of fighting contents to the terminal device 12 of the first user. The information necessary for execution of fighting contents can include information concerning the first user, information concerning an enemy character which may be an opponent in the fighting, and information concerning an assistant character which may be a new game medium, but may not be limited thereto. For example, the information necessary for execution of fighting contents may further include so-called asset data such as image data and voice data which may be used to execute the fighting contents. In the terminal device 12 of the first user, the fighting contents may be executed using the information received from the server device 11.

(Configuration of Terminal Device)

A configuration of the terminal device 12 may be specifically described below. As illustrated in FIG. 1, the terminal device 12 may include a terminal communication unit 17, a terminal storage unit 18, a display unit 19, an input unit 20, and a terminal control unit 21.

The terminal communication unit 17 may include an interface which communicates with an external device in a wireless or wired manner to transmit and receive information. The terminal communication unit 17 may include a wireless communication module, a wireless LAN communication module, or a wired LAN communication module corresponding to a mobile communication standard such as long term evolution (LTE) (registered trademark). The terminal communication unit 17 can transmit and receive information to and from the server device 11 via the network 16.

The terminal storage unit 18 may include, for example, a primary storage device and a secondary storage device. For example, the terminal storage unit 18 may include a semiconductor memory, a magnetic memory, or an optical memory. The terminal storage unit may store various types of information and programs necessary for processing of a game, which may be received from the server device 11. For example, the terminal storage unit 18 may store all or a part of the information concerning the above-mentioned user. All or a part of such information may be retrieved from the server device 11, for example, by the terminal control unit 21.

The display unit 19 may include a display device such as a liquid crystal display or an organic EL display. The display unit 19 can display various screens.

The input unit 20 may include, for example, an input interface including a touch panel which may be installed integrally with the display unit 19. The input unit 20 can receive a user input to the terminal device 12. The input unit 20 may include physical keys or may additionally include an arbitrary input interface such as a pointing device like a mouse.

The terminal control unit 21 may include at least one of one or more general-purpose processors for realizing a specific function by reading a specific program and one or more dedicated processors which may be specialized for a specific process. The terminal control unit 21 may control the entire operations of the terminal device 12. The terminal control unit 21 may perform processing of a game in cooperation with the server device 11. An example of the operations of the terminal control unit 21 may be specifically described below.

The terminal control unit 21 may transmit and receives information via the terminal communication unit 17. For example, the terminal control unit 21 may receive information necessary for processing of a game from the server device 11. The terminal control unit 21 may store the information received from the server device 11 in the terminal storage unit 18.

The terminal control unit 21 may start an application of the game in response to an operation of a user. The terminal control unit 21 may perform processing of the game in cooperation with the server device 11. For example, the terminal control unit 21 may display various screens on the display unit 19. For example, a graphic user interface (GUI) for detecting a user operation may be displayed on a screen. The terminal control unit 21 can detect a user operation on the screen.

An example of the operations of the server device 11 and the terminal device 12 that perform processing of a game in cooperation with each other may be specifically described below with reference to FIGS. 5 to 8.

Figure 5:
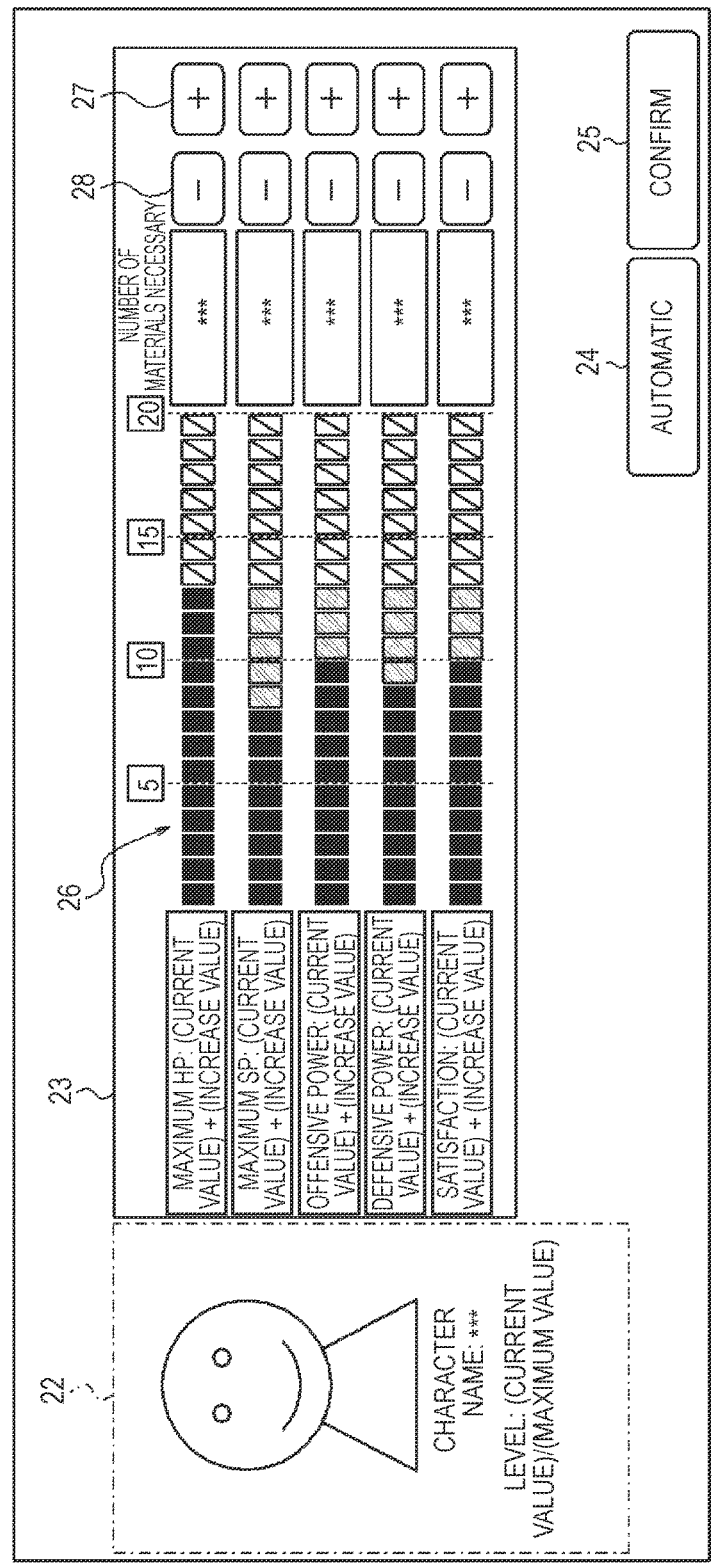
FIG. 5 is a diagram illustrating an example of a first screen which may be displayed on a terminal device.

FIG. 5 illustrates an example of a first screen which may be used to perform a process associated with growing the strength of or leveling up a user character. Briefly, at least one of a plurality of second parameters of a user character may be changed by a user operation on the first screen. The first screen may include a first area 22, a second area 23, an automation button 24, and a confirmation button 25.

Information concerning one user character selected among a plurality of user characters which may game mediums owned by a user may be displayed in the first area 22. For example, an image of the user character, a character name, a current value and a maximum value of a level may be displayed in the first area 22 illustrated in FIG. 5. The information displayed in the first area 22 may not be limited to the above description.

A current value and an increase value of a second parameter, a grade image 26, the number of materials necessary, an increase button 27, and a decrease button 28 may be displayed in the second area 23 for each second parameter of a user character.

The increase value of the second parameter may be a parameter which may be used for a process of increasing the current value of the second parameter. The increase value of the second parameter can have a value equal to or greater than 0 points. As may be described later, the increase value of the second parameter may be changed by a user operation on the increase button 27 or the decrease button 28. Points corresponding to the increase value may be added to the current value of the second parameter by a user operation on the confirmation button 25.

The grade image 26 may be an image indicating a current value and an increase value of the grade of the second parameter (that is, the third parameter corresponding to the second parameter). For example, the grade image 26 illustrated in FIG. 5 may be an indicator in which a left end may be set to a lower limit value (for example, 0 points) and a right end may be set to an upper limit value (for example, 20 points). Each of twenty rectangles included in the indicator corresponds to one point. For example, the number of filled rectangles indicates a current value of a third parameter. The number of hatched rectangles may indicate an increase value of a third parameter. The increase value of a third parameter may be a parameter which may be used for a process of increasing the current value of the third parameter. The increase value of the third parameter can have a value equal to or greater than 0. For example, an increase value of a second parameter may be changed within a range in which the sum of the current value and the increase value of a third parameter may be equal to or less than the upper limit value of the third parameter. In the grade image 26 illustrated in FIG. 5, the upper limit value of a third parameter may be expressed using one or more rectangles with a diagonal line. Specifically, a value (for example, 13 points) obtained by subtracting points (for example, seven points) corresponding to the number of rectangles with a diagonal line from 20 points which may be the upper limit value of the indicator may be the upper limit value of the third parameter.

The number of materials necessary may indicate the number of second materials which may be necessary for increasing the current value of a second parameter and the current value of a third parameter. The number of materials necessary may be determined depending on at least one of the current value and the increase value of the third parameter. For example, as the current value or the increase value of the third parameter increases, the number of materials necessary may increase. When a user does not own the second materials corresponding to the number of materials necessary, the increase button 27, which may be described later, may be prohibited from receiving a user operation. Alternatively, when a user does not own the second materials corresponding to the number of materials necessary, the confirmation button 25, which likewise may be described later, may be prohibited from receiving a user operation.

The increase button 27 may be a GUI that receives a user operation of increasing the increase value of a third parameter or the like. The terminal control unit 21 may increase the increase value of a third parameter, the increase value of a second parameter, and the number of materials necessary in response to a user operation on the increase button 27. The decrease button 28 may be a GUI that receives a user operation of decreasing the increase value of a third parameter or the like. The terminal control unit 21 may decrease the increase value of a third parameter, the increase value of a second parameter, and the number of materials necessary in response to a user operation on the decrease button 28.

The automation button 24 may be a GUI that receives a user operation of automatically determining the increase value of a second parameter, the increase value of a third parameter, and the number of materials necessary, for at least one of a plurality of second parameters. In this embodiment, the terminal control unit 21 automatically may determine the increase value of a second parameter, the increase value of a third parameter, and the number of materials necessary for each second parameter in response to a user operation on the automation button 24. The process of automatically determining the increase value of a second parameter, the increase value of a third parameter, and the number of materials necessary can make use of an arbitrary algorithm.

The confirmation button 25 may be a GUI that receives a user operation of confirming may change of a plurality of second parameters. The terminal control unit 21 may permit receiving of a user operation on the confirmation button 25 when a user owns the second materials corresponding to the number of materials necessary. When a user does not own the second materials corresponding to the number of materials necessary, the terminal control unit 21 may prohibit receiving of a user operation on the confirmation button 25. The terminal control unit 21 may display the confirmation button 25 on which receiving of a user operation may be prohibited in a display mode different from a normal display mode, such as a gray-out display mode. Alternatively, the terminal control unit 21 may not display the confirmation button 25 on which receiving of a user operation may be prohibited.

The terminal control unit 21 may transmit information indicating the increase value of a second parameter, the increase value of a third parameter, and the number of materials necessary for each second parameter to the server device 11 in response to a user operation on the confirmation button 25. In this case, the server control unit 15 of the server device 11 may change the information concerning a user stored in the server storage unit 14 on the basis of the information received from the terminal device 12. For example, the server control unit 15 may increase a second parameter and may increase the third parameter corresponding to the second parameter. Specifically, the server control unit 15 adds points corresponding to the increase value of each second parameter to the current value of the second parameter. The server control unit 15 also adds points corresponding to the increase value of each third parameter to the current value of the third parameter. The server control unit 15 may increase a level which may be the first parameter of a user character with may change of a plurality of second parameters. The server control unit 15 may decrease the number of second materials which may be owned by a user by the number of materials necessary.

Alternatively, the terminal control unit 21 may change the information concerning a user in response to a user operation on the confirmation button 25. In this case, the terminal control unit 21 may transmit the changed information concerning a user to the server device 11. The server control unit 15 of the server device 11 may update the unchanged information concerning a user stored in the server storage unit 14 to the changed information concerning a user received from the terminal device 12.

Figure 6:
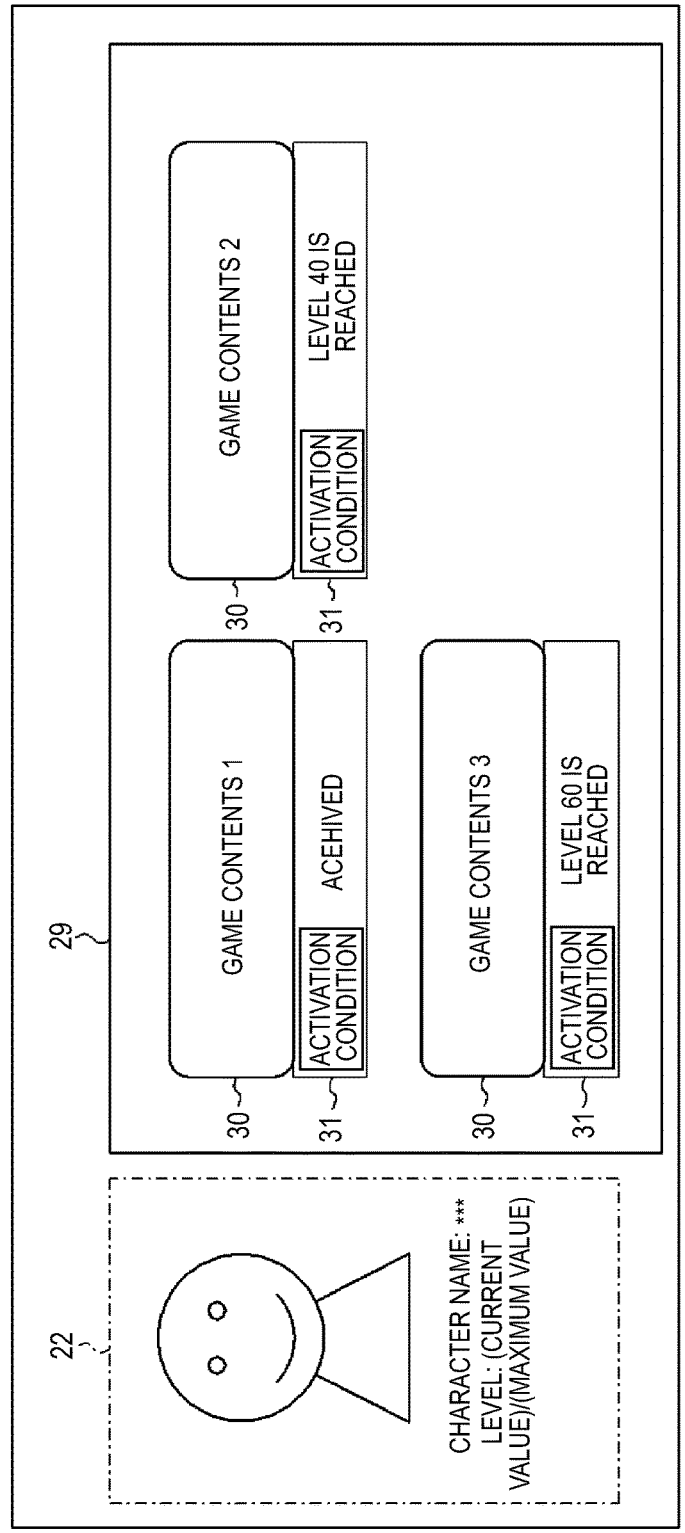
FIG. 6 is a diagram illustrating an example of a second screen which may be displayed on the terminal device.

FIG. 6 illustrates an example of a second screen which may be used to perform the processing associated with growing the strength of or leveling up a user character. Briefly, a game function of a user character may be activated in response to a user operation on the second screen. The second screen may include a first area 22 and a third area 29. The first area 22 in the second screen may be the same as the first area 22 in the first screen and thus description thereof will not be repeated.

In the third area 29, a start button 30 and an activation condition 31 may be displayed for each game function of a user character.

The start button 30 may be a GUI that receives a user operation of starting release contents of a game function. The terminal control unit 21 may execute corresponding release contents in response to a user operation on the start button 30. The terminal control unit 21 may retrieve information necessary for execution of the release contents from the server device 11 at the time of executing the release contents. For example, in the example illustrated in FIG. 6, three start buttons 30 may be displayed.

The activation condition 31 may indicate one or more conditions for permitting receiving of a user operation on the start button 30. For example, the activation condition 31 may include a condition in which the level of a user character may be equal to or greater than a predetermined reference value corresponding to a game function. The activation condition 31 may include a condition that a predetermined game task (for example, a task designated as a task to be cleared) set in the release contents corresponding to a game function may not be achieved. The activation condition 31 may include a condition that a game function is not activated. The terminal control unit 21 may permit receiving of a user operation on the start button 30 when the activation condition 31 is satisfied, and may prohibit receiving of a user operation on the start button 30 when the activation condition 31 is not satisfied. The terminal control unit 21 may display the start button 30 on which receiving of a user operation may be prohibited in a display mode different from a normal display mode, such as a gray-out display mode. Alternatively, the terminal control unit 21 may not display the start button 30 on which receiving of a user operation is prohibited.

In this embodiment, the terminal control unit 21 may transmit an execution result of the release contents to the server device 11. The execution result of the release contents may include, for example, information indicating whether achievement of the game task (for example, the task designated as a task to be cleared) set in the release contents succeeds. When the execution result of the release contents is received from the terminal device 12, the server control unit 15 of the server device 11 may determine whether the one or more first activation conditions may be satisfied. When it is determined that the one or more first activation conditions may be satisfied, the server control unit 15 may activate the game function.

Figure 7:
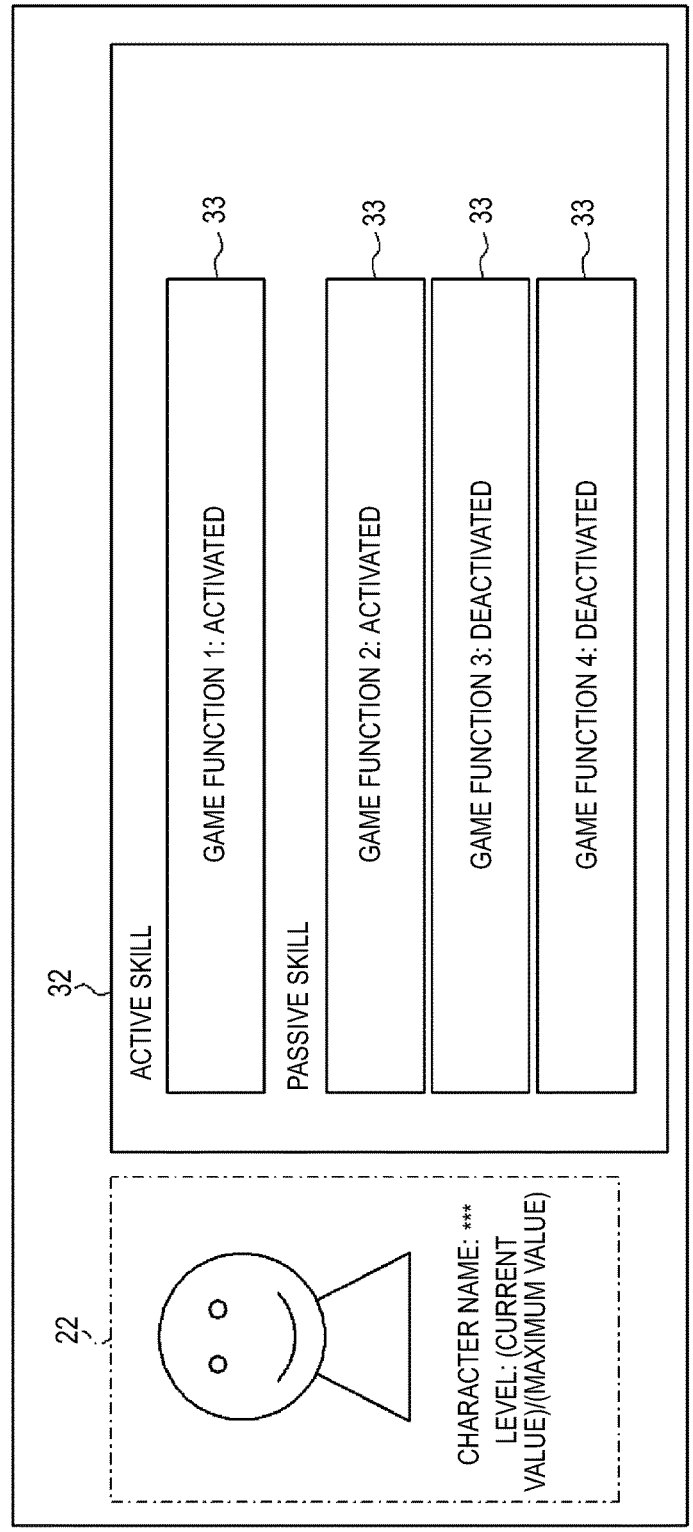
FIG. 7 is a diagram illustrating an example of a third screen which may be displayed on the terminal device.

FIG. 7 illustrates an example of a third screen which may be used to perform the processing associated with growing the strength of or leveling up a user character. Briefly, the grade of a game function of a user character may be changed in response to a user operation on the third screen. The third screen may include a first area 22 and a fourth area 32. The first area 22 in the third screen may be the same as the first area 22 in the first screen and thus description thereof will not be repeated.

In the fourth area 32, a game function image 33 may be displayed for each game function of a user character. Information concerning a game function may be displayed in the game function image 33. For example, a name of the game function, an effect that occurs based on the execution of a game function, information indicating that the game function may be activated or deactivated, and the grade of the game function may be displayed in the game function image 33.

The game function image 33 may serve as a GUI that receives a user operation of increasing the grade of a game function. The terminal control unit 21 may permit receiving a user operation on the game function image 33 when the third materials corresponding to the number of materials necessary to increase the grade of the game function may be owned by a user. The terminal control unit 21 may prohibit receiving of a user operation on the game function image 33 when the third materials corresponding to the number of materials necessary to increase the grade of the game function are not owned by a user. The terminal control unit 21 may display the game function image 33 on which receiving of a user operation may be prohibited in a display mode different from a normal display mode, such as a gray-out display mode. Alternatively, the terminal control unit 21 may not display the game function image 33 on which receiving of a user operation may be prohibited.

The terminal control unit 21 may transmit a request for increasing the grade of a game function to the server device 11 in response to a user operation on the game function image 33. In this case, when the request is received from the terminal device 12, the server control unit 15 of the server device 11 may change the information concerning a user stored in the server storage unit 14. Specifically, the server control unit 15 may increase the grade of a game function of a user character. The server control unit 15 may decrease the number of third materials owned by a user by the number of materials necessary for increasing the grade of the game function.

Figure 8:
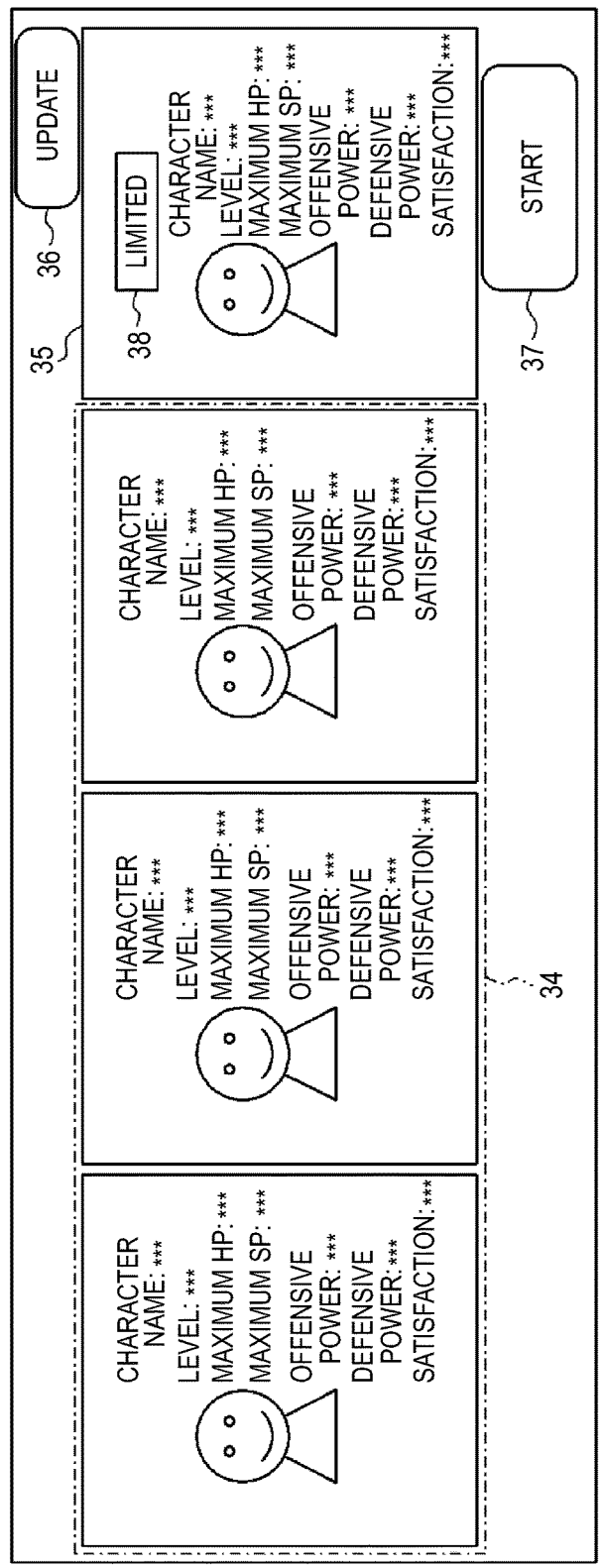
FIG. 8 is a diagram illustrating an example of a fourth screen which may be displayed on the terminal device.

FIG. 8 illustrates an example of a fourth screen which may be used to perform processing of fighting contents. Briefly, an assistant character which may be used by a user in the fighting contents may be prepared in response to a user operation on the fourth screen. The fighting contents may be started in response to a user operation on the fourth screen. The fourth screen may include a fifth area 34, a sixth area 35, an update button 36, and a start button 37.

In the fifth area 34, information concerning a user character may be displayed for each user character which may be a used game medium of a user. For example, an image and a character name, a first parameter (level), and a plurality of second parameters (such as a maximum HP) of a user character may be displayed in the fifth area 34 illustrated in FIG. 8. The information displayed in the fifth area 34 may not be limited to the above description.

Information concerning an assistant character may be displayed in the sixth area 35. For example, an image and a character name, a first parameter (level), and a plurality of second parameters (such as a maximum HP) of an assistant character, and a notification image 38 may be displayed in the sixth area 35 illustrated in FIG. 8. The image and the character name of the assistant character may be the same as the reference game medium of the second user determined in the server device 11 as described above. The notification image 38 may be displayed, for example, when the above-mentioned characteristic value is smaller than the level of the reference game medium of the second user. A user viewing the notification image 38 can recognize that the assistant character may be adjusted, for example, with respect to the reference game medium of the second user at a glance. The information displayed in the sixth area 35 may not be limited to the above description. For example, an image for comparing a plurality of second parameters of the assistant character with a plurality of second parameters of the reference game medium of the second user may be displayed in the sixth area 35. The comparison image may include, for example, a radar chart illustrated in FIG. 4.

The update button 36 may be a GUI that receives a user operation of changing the assistant character. The terminal control unit 21 may transmit a predetermined request to the server device 11 in response to a user operation on the update button 36. In this case, the server device 11 and the terminal device 12 may determine a second user among a plurality of users in cooperation with each other again. The server control unit 15 of the server device 11 may prepare an assistant character on the basis of information concerning the reference game medium of the determined second user again. In this way, the assistant character may be changed.

Alternatively, the terminal control unit 21 may transmit information indicating a filter condition along with the above-mentioned request to the server device 11 in response to a user operation on the update button 36. The filter condition may include an arbitrary condition concerning the assistant character. For example, the filter condition may include a condition that a first parameter (level), second parameters (for example, a maximum HP), or a third parameter (for example, an HP grade) of an assistant character may be equal to or greater than a predetermined value when the assistant character may be prepared and a condition that a predetermined game function may be set to be activated in an assistant character when the assistant character may be prepared. The predetermined value and the predetermined game function included in the filter condition may be determined in response to a user operation on the terminal device 12, or may be automatically determined by the terminal control unit 21. The server control unit 15 may determine a second user among a plurality of users such that an assistant character satisfying the filter condition can be prepared. According to this configuration, only an assistant character satisfying the filter condition may be prepared. Accordingly, since likelihood that game contents can be played using an assistant character satisfying a filter condition which may be desired by a user may increase, it may be possible to improve usability. Transmission of information indicating the filter condition may not be limited to a user operation on the update button 36 but may be performed in response to an arbitrary user operation on the terminal device 12.

Changing and determination of an assistant character may not be limited to the above-mentioned processing, but may be performed by arbitrary processing. For example, the terminal control unit 21 may transmit a request for preparing one or more candidate characters including candidates for an assistant character to the server device 11 automatically or in response to a user operation. The terminal control unit 21 may additionally transmit information indicating the above-mentioned filter condition to the server device 11. The server control unit 15 of the server device 11 may select one or more candidate users which may be candidates for a second user among a plurality of users. Here, the server control unit 15 may select one or more candidate users among a plurality of users such that an assistant character satisfying the filter condition can be prepared. The server control unit 15 may prepare one or more assistant characters corresponding to the one or more candidate users as candidate characters. The server control unit 15 may transmit information concerning the one or more candidate characters to the terminal device 12. The terminal control unit 21 may display a dedicated screen or a dialog for selecting an assistant character among the one or more candidate characters on the display unit 19. Information concerning the candidate characters (for example, a character name, a level, a maximum HP, and a game effect) may be displayed in the screen or the dialog. The terminal control unit 21 may select an assistant character among the one or more candidate characters automatically or in response to a user operation. The selected assistant character may be displayed, for example, on the fourth screen illustrated in FIG. 8.

The start button 37 may be a GUI that receives a user operation of starting fighting contents. The terminal control unit 21 may start the fighting contents in response to a user operation on the start button 37. In the fighting contents, a user may operate a user character and an assistant character, which may be used as game mediums to perform, for example, exploration of a virtual space and fighting with an opponent.

The operation of the server device 11 that may perform processing associated with growing the strength of or leveling up a user character may be described below with reference to FIG. 9.

Step S100: The server control unit 15 may store information concerning a user in the server storage unit 14. The process of storing the information concerning a user may include a process of correlating and storing each of a plurality of users and information concerning one or more user characters including one first parameter and a plurality of second parameters for each user character.

Step S101: The server control unit 15 may change a rarity of a user character by consuming the first material which may be owned by a user, for example, when one or more rarity conditions may be satisfied.

Step S102: The server control unit 15 may change at least one second parameter which may be automatically selected or selected in response to a user operation on the terminal device 12 among a plurality of second parameters of the user character by consuming the second material owned by the user.

Step S103: The server control unit 15 may change a third parameter corresponding to the second parameter and a first parameter of the user character with the change of the second parameter in Step S102.

Step S104: The server control unit 15 may activate a game function of the user character, for example, when one or more first activation conditions may be satisfied. The one or more first activation conditions may include a condition that the first parameter of the user character may be equal to or greater than a predetermined reference value.

Step S105: The server control unit 15 may change the grade of the game function of the user character by consuming the third material owned by the user.

The order of steps from Step S100 to Step S105 may be arbitrarily changed within a logically consistent range. Some steps among Steps S100 to S105 may not be performed.

The operation of the server device 11 which may perform processing fighting contents may be described below with reference to FIG. 10.

Step S200: The server control unit 15 may extract one or more users among a plurality of users except for the first user using a predetermined algorithm in response to a request from the terminal devices 12 of the first user.

Step S201: The server control unit 15 may transmit information concerning the extracted one or more users to the terminal device 12 of the first user.

Step S202: The server control unit 15 may determine a second user. Specifically, the server control unit 15 may determine one user who may be automatically selected or selected in response to a user operation of a user on the terminal device 12 among the extracted one or more users as the second user.

Step S203: The server control unit 15 may determine a characteristic value on the basis of the information concerning one or more user characters which may be game mediums used by the first user.

Step S204: The server control unit 15 may prepare a new game medium (for example, an assistant character) on the basis of information concerning the reference game medium of the second user and a ratio of the characteristic value to the level of the reference game medium.

Step S205: The server control unit 15 may determine whether two or more second activation conditions may be satisfied. The two or more second activation conditions include, for example, a condition that the first parameter of the reference game medium of the second user may be equal to or greater than a reference value and a condition that the characteristic value determined in Step S203 may be equal to or greater than the reference value. When it is determined that the two or more second activation conditions are satisfied (YES in Step S205), the process flow may transition to Step S206. On the other hand, when it is determined that the two or more second activation conditions are not satisfied (NO in Step S205), the process flow may transition to Step S207.

Step S206: When it is determined in Step S205 that two or more second activation conditions are satisfied (YES in Step S205), the server control unit 15 may activate a game function of the new game medium prepared in Step S204.

Step S207: Subsequently to Step S206 or when it is determined in Step S205 that the two or more second activation conditions are not satisfied (NO in Step S205), the server control unit 15 may transmit information necessary for execution of game contents which progress using the new game medium prepared in Step S204 to the terminal device 12.

The order of steps from Step S200 to Step S207 may be arbitrarily changed within a logically consistent range. Some steps among Steps S200 to S207 may not be performed.

As described above, the server device 11 according to this embodiment may determine a characteristic value on the basis of information concerning a game medium correlated with the first user. The server device 11 may prepare a new game medium on the basis of the information concerning the reference game medium of the second user and the ratio of the characteristic value to the first parameter of the reference game medium. The first user may play game contents using the new game medium. According to this configuration, it may be possible to adjust a power of the new game medium which is used by the first user in consideration of the power of the game medium of the first user with respect to the power of the reference game medium of the second user. Accordingly, in comparison with a configuration in which the first user uses the same game medium as the reference game medium of the second user, it may be possible to more easily adjust game balance. Since features of the reference game medium of the second user (for example, a variation tendency of each second parameter) may be reflected in the assistant character, it may be possible to enhance attractiveness of a game.

While the invention has been described above on the basis of all the drawings and embodiments, it should be noted that those skilled in the art can easily perform various modifications or corrections on the basis of this disclosure. Accordingly, it should be noted that such modifications or corrections may be included in the scope of the invention. For example, functions included in means or steps can be rearranged without logical contradiction, and a plurality of means or steps may be combined into a single means or step or may be divided.

For example, in the above-mentioned embodiment, some or all of the operations and processes which may be performed by the server device 11 may be performed by the terminal device 12. Similarly, some of the operations which may be performed by the terminal device 12 may be performed by the server device 11. For example, processes such as display control of various screens or control of various GUIs displayed on the terminal device 12 may be performed by any one of the server device 11 and the terminal device 12 or may be performed by the cooperation of the server device 11 and the terminal device 12 with each other. Alternatively, the game system 10 may not include the server device 11. In this case, the terminal device 12 may store information, which may be received from the server device 11 in the above-mentioned embodiment, in advance.

In the above-mentioned embodiment, a configuration in which the server control unit 15 of the server device 11 may change the first parameter (level) depending on the change of the second parameter (for example, a maximum HP) selected automatically or selected in response to a user operation among a plurality of second parameters of a user character has been described above. However, the processes of changing the first parameter and the second parameter of a user character may not be limited to the above description.

For example, the server control unit 15 may change the second parameter selected automatically or selected in response to a user operation within a range corresponding to the first parameter. Specifically, the server control unit 15 may increase the first parameter of a user character, for example, with progress of a game. The server control unit 15 may increase points necessary for changing the second parameters whenever the first parameter increases. The sum value of the points may be arbitrarily determined. For example, the sum value of the points may be equal to a value obtained by multiplying the first parameter of a user character by a predetermined coefficient or may be a value set for each value of the first parameter of the user character. The server control unit 15 may change the second parameter selected automatically or selected in response to a user operation by consuming the points. Accordingly, the second parameter can be changed within a range of points corresponding to the first parameter.

In the above-mentioned embodiments, a configuration in which the first user plays game contents using a new game medium (for example, an assistant character) which may be prepared on the basis of information on the reference game medium of the second user and the ratio of the characteristic value to the first parameter of the reference game medium has been described above. However, instead of the configuration in which a new game medium may be prepared, for example, a configuration in which the reference game medium of the second user may be temporarily corrected by multiplying the second parameters of the reference game medium by the above-mentioned ratio can be adopted. In this case, the first user plays game contents using the corrected reference game medium. The second parameters which have been temporarily corrected may be returned to the uncorrected values, for example, when the game contents end.

For example, in game contents in which a game medium of a first user fights with a game medium of an opponent, the second parameters of the game medium of the opponent may be temporarily corrected using a ratio of a characteristic value to the first parameter of the game medium of the opponent. Alternatively, the second parameters of the game medium of the first user may be temporarily corrected using a ratio of the first parameter of the game medium of the opponent to the characteristic value. According to this configuration, it may be possible to cause powers of game mediums fighting with each other to compete and to maintain features of each game medium. Accordingly, it may be possible to appropriately adjust game balance and to improve attractiveness of a game.

For example, in a multi-player type of game contents in which a plurality of users operate game mediums respectively, second parameters of a game medium of a second user may be temporarily corrected using a ratio of a characteristic value to the first parameter of the game medium of the second user. Alternatively, second parameters of a game medium of a first user may be temporarily corrected using a ratio of a first parameter of a game medium of a second user to a characteristic value. The second user may be, for example, a user included in a predetermined user group or may be a user included in the same user group as the first user. According to this configuration, it may be possible to cause powers of game mediums fighting with each other to compete and to maintain features of each game medium. Accordingly, it may be possible to appropriately adjust game balance and to improve attractiveness of a game.

Second parameters of a game medium of a first user may be temporarily corrected using a ratio of a predetermined parameter determined in game contents which may be played by the first user to a characteristic value. The predetermined parameter determined in the game contents may include, for example, difficulty and level of the game contents. For example, the server control unit 15 may determine the predetermined parameter for each game contents. According to this configuration, it may be possible to easily adjust game balance similarly to the above-mentioned embodiment.

In the above-mentioned embodiment, a configuration in which the first parameter (for example, a level) may be a sum value of a plurality of third parameters (for example, an HP grade, an SP grade, an offensive power grade, a defensive power grade, and a critical hit likelihood grade) has been described. However, an algorithm for determining the first parameter may not be limited to the above-mentioned example. For example, information concerning a user character may not include the third parameter. In this case, the server control unit 15 may change the first parameter (level) of the user character with a change of the second parameter. Specifically, the server control unit 15 may change the first parameter of the user character, for example, when the second parameter may change.

In the above-mentioned embodiment, the first material necessary for increasing the rarity of a user character, the second material necessary for increasing the second parameter and the grade of the second parameter, the third material necessary for increasing the grade of the game function have been described. However, each of the first material, the second material, and the third material may include one or more types of game mediums. For example, two types of game mediums including Game medium A and Game medium B may be used as the first material. The first material, the second material, and the third material may include a game medium which may be common thereto. For example, Game medium A may be used as the first material and may also be used as the second material.

In the above-mentioned embodiment, at least a part of a screen displayed on the terminal device 12 may be set to a web display which may be displayed on the terminal device 12 on the basis of data generated by the server device 11, and at least a part of the screen may be set to a native display which may be displayed by a native application installed in the terminal device 12. In this way, a game according to the above-mentioned embodiment may be a hybrid game of which some of processes may be taken charge of by the server device 11 and the terminal device 12.

An information processing apparatus such as a computer or a mobile phone may be suitably used to serve as the server device 11 or the terminal device 12 according to the above-mentioned embodiment. Such an information processing apparatus can be realized by storing a program in which processing details for realizing the functions of the server device 11 or the terminal device 12 according to the above-mentioned embodiment may be described in a storage unit of the information processing apparatus and causing a CPU of the information processing apparatus to read and execute the program.

What is claimed is:

1. A computer program product embodied on a non-transitory computer-readable medium and containing instructions that, when executed, cause an information processing apparatus configured to communicate with a plurality of terminal devices used by a plurality of users, respectively, to perform:
   a step of storing each of the plurality of users and information concerning one or more game mediums, including one first parameter and a plurality of second parameters for each game medium, in correlation with each other;
   a step of changing, for one game medium in the one or more game mediums, the one game medium correlated with a user in the plurality of users, at least one of:
   the first parameter of the game medium, the first parameter of the game medium being changed in accordance with a change of at least one second parameter of the game medium which is automatically selected or selected by a user operation of the user; or
   the at least one second parameter of the game medium, the at least one second parameter of the game medium being automatically selected or selected by the user operation within a range corresponding to the first parameter;
   a step of determining a characteristic value on the basis of the information concerning at least one first user game medium in the plurality of game mediums, the at least one first user game medium correlated with a first user;
   a step of preparing a new game medium on the basis of the information concerning a reference game medium among one or more game mediums in the plurality of game mediums that are correlated with a second user, and on the basis of a ratio of the characteristic value to a first parameter of the reference game medium; and
   a step of transmitting information, the information being required for execution of game contents which progress using the new game medium, to a first terminal device of the first user.

2. The computer program product according to claim 1, wherein the game contents are contents which progress using the new game medium and the at least one game medium correlated with the first user, the at least one game medium correlated with the first user having at least one first parameter; and
   the characteristic value is a maximum value or an average value of the first parameter in the at least one game medium.

3. The computer program product according to claim 1, wherein a plurality of second parameters of the new game medium are the same as values obtained by changing a plurality of second parameters of the reference game medium at the ratio.

4. The computer program product according to claim 1, wherein the information processing apparatus is caused to further perform:
   a step of activating, with regard to the game medium correlated with the user, a game function corresponding to the game medium, when one or more conditions including at least a condition that the first parameter of the game medium is equal to or greater than a reference value are satisfied; and
   a step of activating, with regard to the new game medium, a game function corresponding to the new game medium when two or more conditions including at least a condition that the first parameter of the reference game medium is equal to or greater than the reference value and a condition that the characteristic value is equal to or greater than the reference value are satisfied.

5. The computer program product according to claim 1, wherein the information processing apparatus is caused to further perform:
   a step of extracting one or more users other than the first user among the plurality of users using a predetermined algorithm; and a step of determining one user from among the extracted one or more users as the second user, is the second user being selected automatically or by a user operation on the first terminal device.

6. An information processing apparatus which can communicate with a plurality of terminal devices used by a plurality of users, the information processing apparatus comprising:

a storage unit configured to store each of the plurality of users and information concerning one or more game mediums, including one first parameter and a plurality of second parameters for each game medium in correlation with each other; and a control unit, wherein the control unit is configured to change, for a game medium in the one or more game mediums, the game medium correlated with a user in the plurality of users, at least one of:

the first parameter of the game medium, the first parameter of the game medium being changed in accordance with a change of at least one second parameter of the game medium which is automatically selected or selected by a user operation of the user; or the at least one second parameter of the game medium, the at least one second parameter of the game medium being automatically selected or selected by the user operation within a range corresponding to the first parameter;

determine a characteristic value on the basis of the information concerning at least one first user game medium in the plurality of game mediums, the at least one first user game medium correlated with a first user;

prepare a new game medium on the basis of the information concerning a reference game medium among one or more game mediums in the plurality of game mediums that are correlated with a second user, and on the basis of a ratio of the characteristic value to a first parameter of the reference game medium; and transmit information, the information being required for execution of game contents which progress using the new game medium, to a first terminal device of the first user.

7. A control method of a game which is performed by an information processing apparatus configured to communicate with a plurality of terminal devices used by a plurality of users, the control method comprising:

a step of storing each of the plurality of users and information concerning one or more game mediums, including one first parameter and a plurality of second parameters for each game medium, in correlation with each other;

a step of changing, for one game medium in the one or more game mediums, the one game medium correlated with a user in the plurality of users, at least one of:

the first parameter of the game medium, the first parameter of the game medium being changed in accordance with a change of at least one second parameter of the game medium which is automatically selected or selected by a user operation of the user; or the at least one second parameter of the game medium, the at least one second parameter of the game medium being automatically selected or selected by the user operation within a range corresponding to the first parameter;

a step of determining a characteristic value on the basis of the information concerning at least one first user game medium in the plurality of game mediums, the at least one first user game medium correlated with a first user;

a step of preparing a new game medium on the basis of the information concerning a reference game medium among one or more game mediums in the plurality of game mediums that are correlated with a second user, and on the basis of a ratio of the characteristic value to a first parameter of the reference game medium; and a step of transmitting information, the information being required for execution of game contents which progress using the new game medium, to a first terminal device of the first user.

* * * * *